United States Patent [19]

Shieh

[11] Patent Number: 5,515,947
[45] Date of Patent: *May 14, 1996

[54] MOTORCYCLE DISK BRAKE LOCK

[76] Inventor: Jin-Ren Shieh, No. 178, Shih Chia Rd., Taichung, Taiwan

[ * ] Notice: The term of this patent shall not extend beyond the expiration date of Pat. No. 5,388,436.

[21] Appl. No.: 368,655

[22] Filed: Jan. 4, 1995

[51] Int. Cl.⁶ .......................... B60R 25/00; B60R 25/08; E05B 67/22
[52] U.S. Cl. .................................. 188/69; 70/32; 70/233; 70/226; 188/265
[58] Field of Search ................................ 188/265, 31, 17, 188/18 R, 18 A, 69; 70/32, 33, 34, 233, 225, 226, 38 R

[56] References Cited

U.S. PATENT DOCUMENTS

| | | | |
|---|---|---|---|
| 5,265,451 | 11/1993 | Phifer | 70/226 |
| 5,365,758 | 11/1994 | Shieh | 70/226 |
| 5,379,618 | 1/1995 | Shieh | 70/33 |
| 5,388,436 | 2/1995 | Shieh | 70/226 |

FOREIGN PATENT DOCUMENTS 2237057  4/1991  United Kingdom ................... 70/38 R

*Primary Examiner*—Josie Ballato
*Attorney, Agent, or Firm*—Browdy and Neimark

[57] ABSTRACT

A motorcycle disk brake lock comprises a main body, a lock bolt and a locking member. The main body has a base portion, a first arm, a second arm, and an insertion slot formed between the first arm and the second arm for receiving therein a motorcycle disk brake. The lock bolt is disposed on the first arm such that the lock bolt can be moved back and forth in a direction parallel to an open end of the insertion slot. The lock bolt has a retaining portion corresponding in location to the open end of the insertion slot. The lock bolt is provided along the edge thereof with at least one first locating portion. The locking member has a second locating portion capable of moving in a direction perpendicular to the moving direction of the lock bolt to engage the first locating portion. The distance between the retaining portion and the insertion slot of the main body can be adjusted so as to disable the motorcycle disk brakes of various outer diameters.

12 Claims, 3 Drawing Sheets

MOTORCYCLE DISK BRAKE LOCK

FIELD OF THE INVENTION

The present invention relates generally to a motorcycle lock, and more particularly to a motorcycle disk brake lock for incapacitating the motorcycle.

BACKGROUND OF THE INVENTION

The conventional motorcycle disk brake lock is generally provided with a rectangular lock body having a slot for receiving therein the disk brake. A lock bolt is put horizontally through the slot and a heat radiating hole of the disk brake so as to disable the motorcycle. Such a motorcycle disk brake lock as described above is defective in design in that the lock body of the disk brake lock is engaged with the outer edge of the disk brake when the distance between the lock bolt and the slot of the lock body is too small, and that the inner portion of the lock body can touch the motorcycle hub to preclude the lock bolt being put through the heat radiating hole of the disk brake when the distance between the lock bolt and the slot of the lock body is too great. In addition, the lock bolt can not be easily put through the heat radiating hole of the disk brake if the disk brake happens to have a small outer diameter.

SUMMARY OF THE INVENTION

It is therefore the primary objective of the present invention to provide a motorcycle disk brake lock with a disk brake receiving slot and a lock bolt which are so disposed that the distance between the disk brake receiving slot and the lock bolt is adjustable.

It is another objective of the present invention to provide a motorcycle disk brake lock which can be used to disable the motorcycle disk brakes of various outer diameters.

The foregoing objectives of the present invention are attained by a motorcycle disk brake lock, which comprises a main body, a lock bolt and a locking member. The main body has a base portion, a first arm and a second arm which are extended outwards from the base portion such that they form therebetween a slot for receiving therein a disk brake. The lock bolt is disposed on the first arm such that the lock bolt can be moved back and forth in a direction parallel to the open end of the slot. The lock bolt has a retaining portion of a predetermined length and corresponding in location to the open end of the slot. The lock bolt is provided along the edge thereof with at least one first locating portion. The distance between the retaining portion and the slot of the main body can be adjusted so as to disable motorcycle disk brakes of various outer diameters.

DETAILED DESCRIPTION OF THE INVENTION

Figure 1:
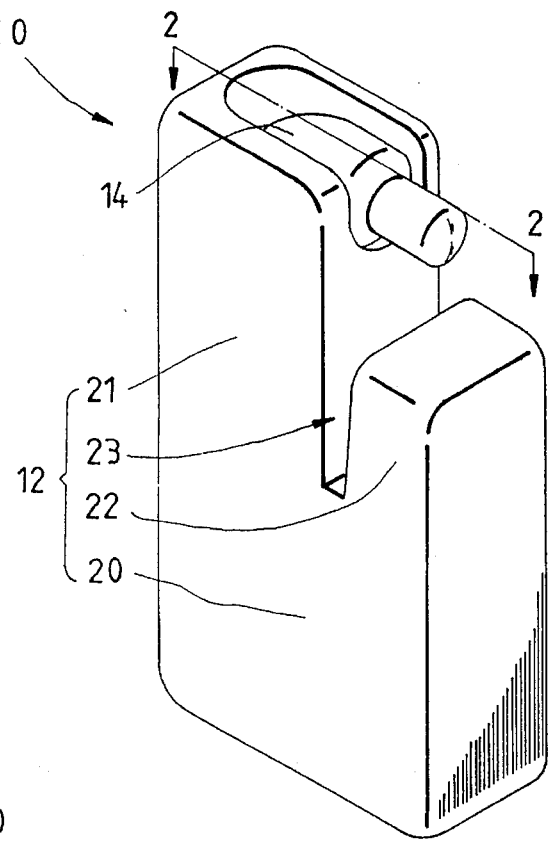
FIG. 1 shows a perspective view of a first preferred embodiment of the present invention.
Figure 2:
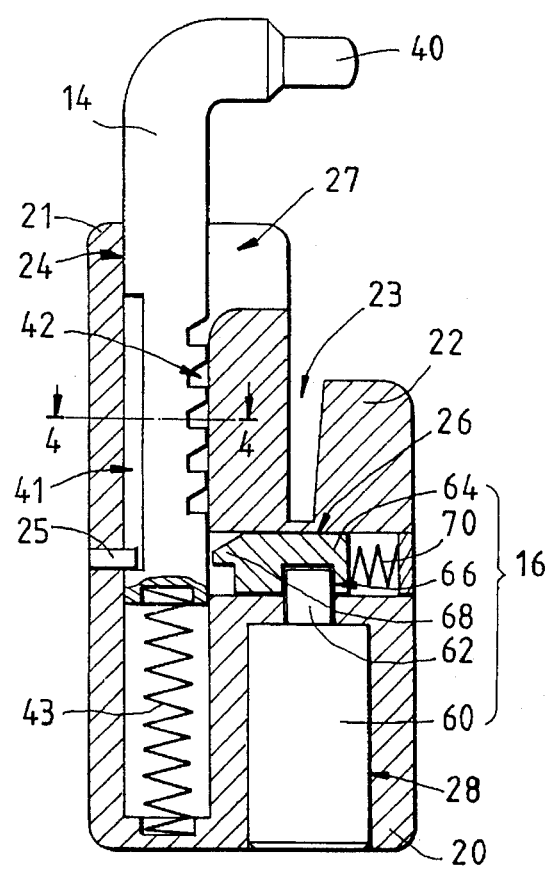
FIG. 2 is a sectional view of a portion taken along the line 2—2 as shown in FIG. 1, showing is the lock bolt is located at an unlocked position.
Figure 4:
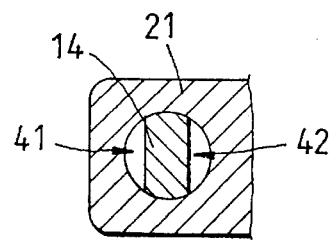
FIG. 4 shows a sectional view of a portion taken along the line 4—4 as shown in FIG. 2.

As shown in FIGS. 1–4, a motorcycle disk brake lock 10 of the first preferred embodiment of the present invention comprises a main body 12, a lock bolt 14 capable of moving back and forth on the main body 12, and a first locking member 16 in a first embodiment of the invention or a second locking member 18 in a second embodiment of the invention, both of which are further described below and are intended to locate the lock bolt 14.

The main body 12 has a base portion 20, a first arm 21 extending upwards from the left side of the upper end of the base portion 20, a second arm 22 extending upwards from the right side of the upper end of the base 20, an insertion slot 23 formed between the first arm 21 and the second arm 22, a first recess 24 formed in the top of the first arm 21 and provided therein with a retaining pin 25, a second recess 26 extending rightwards from the inner side of the first recess 24, a trough 27 disposed in the top of the first arm 21 such that the trough 27 is in communication with the right side of the first arm 21, and that the trough 27 is located over the insertion slot 23, and a third recess 28 extending upwards from the bottom of the base portion 20 and having an upper end in communication with the second recess 26.

The lock bolt 14 has a lower end which is disposed in the first recess 24. The lock bolt 14 has an upper end extending rightwards and horizontally to form a retaining portion 40. The lock bolt 14 is provided peripherally with a guide slot 41 extending along the axial direction thereof. The guide slot 41 is so dimensioned as to receive therein the retaining pin 25 for limiting the sliding distance of the lock bolt 14 in the first recess 24. The lock bolt 14 is further provided with a plurality of locating portions 42 and a first spring 43 located between the lower end of the lock bolt 14 and the bottom of the first recess 24 such that the first spring 43 urges the lock bolt 14 out of the first recess 24.

The first locking member 16 comprises a first lock body 60 fastened to the third recess 28, a first lock core 62 having one end fastened to the first lock body 60 and another end extending to remain in the second recess 26 and capable of being driven by the first lock body 60 to swivel axially in the second and the third recesses 26 and 28, a sliding block 64 disposed in the second recess 26 such that the sliding block 64 is capable of moving back and forth. The sliding block 64 is provided with an indentation 66 dimensioned to receive therein the first lock core 62. The left end of the sliding block 64 is wedge-shaped and capable of extending to reach the second locating portion 68 of the first recess 24. The first locking member 16 further comprises a second spring 70 disposed between the sliding block 64 and the bottom of the second recess 26 such that the second spring urges the sliding block 64 leftwards.

In operation, the first lock core 62 is first so turned as to release the sliding block 64 before the retaining portion 40 of the lock bolt 14 is placed in a heat-radiating hole 74 of a motorcycle disk brake 72. The lock bolt 14 is then pushed to remain in the first recess 24. In the meantime, the edge of the disk brake 72 is received in the insertion slot 23. When the lock bolt 14 is moved to an appropriate position, the sliding block 64 is pushed by the second spring 70 so that the second locating portion 68 is inserted into the first locating portion 42 and that the lock bolt 14 can not be caused to slide outwards. The lock bolt 14 can be released by turning the first lock core 62 to force the sliding block 64 to move rightwards to separate the first and the second locating portions 42 and 68, thereby enabling the lock bolt 14 to slide freely.

The moving direction of the lock bolt 14 is parallel to the direction in which the open end of the insertion slot 23 faces. As a result, the motorcycle disk brake lock 10 of the present invention is capable of incapacitating the disk brakes 72 of various outer diameters.

Figure 5:
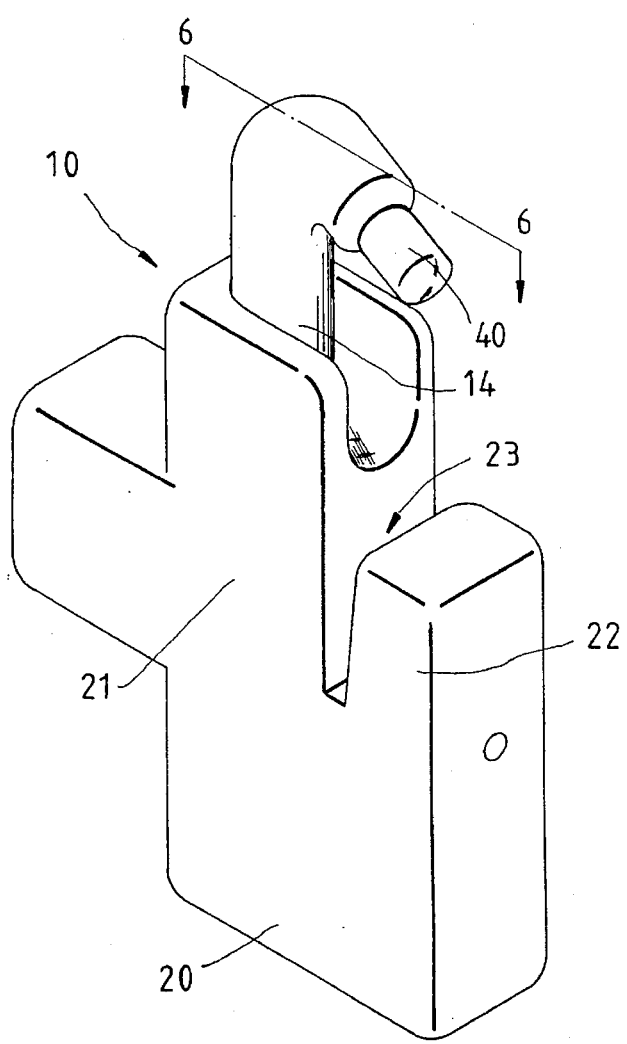
FIG. 5 shows a perspective view of a second preferred embodiment of the present invention.
Figure 3:
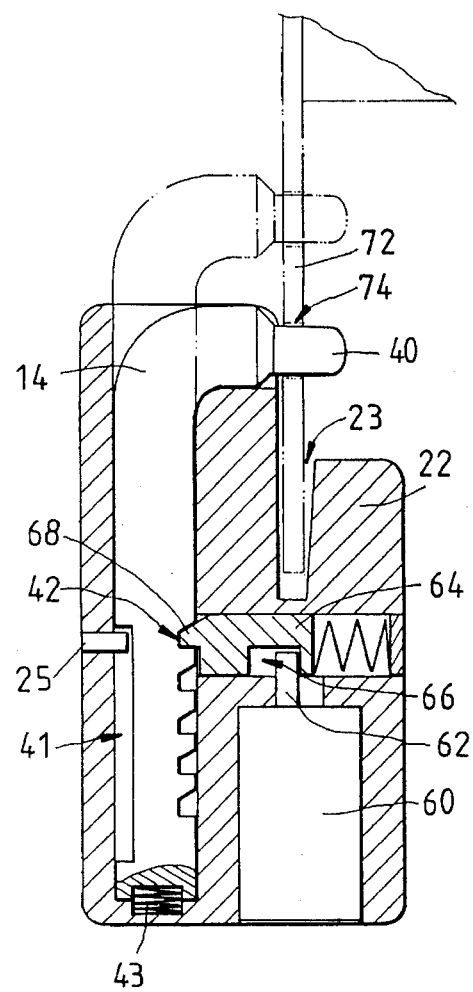
FIG. 3 is a sectional view of a portion taken along the line 2—2 as shown in FIG. 1, showing the lock bolt located at a locked position.
Figure 6:
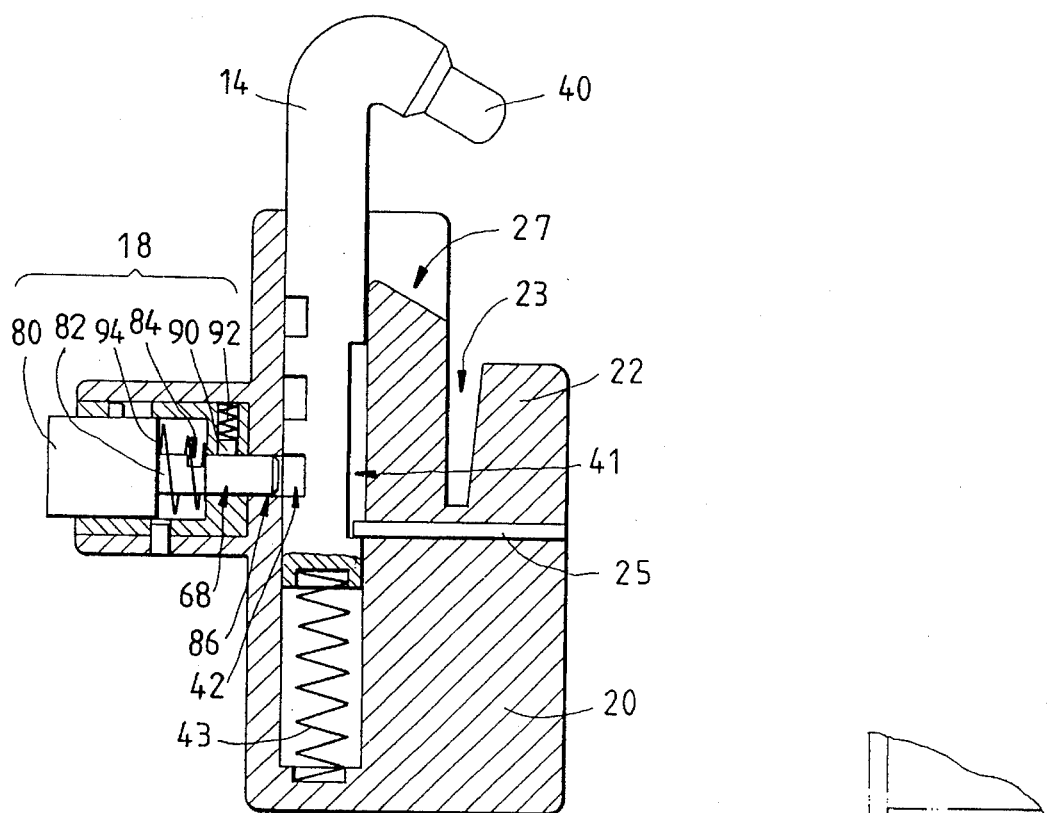
FIG. 6 is a sectional view of a portion taken along the line 6—6 as shown in FIG. 5, showing the lock bolt and the locking member located at an unlocked position.
Figure 7:
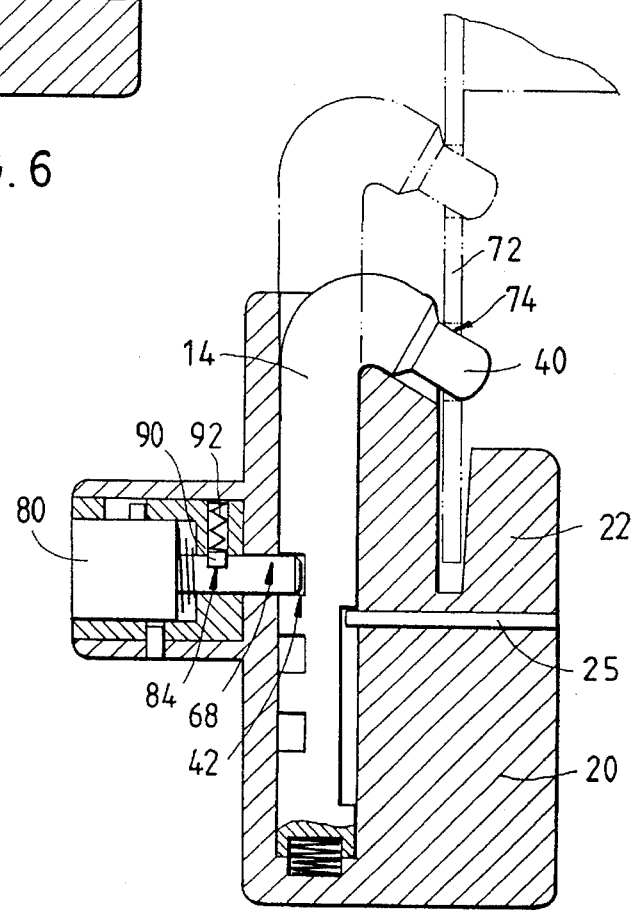
FIG. 7 is a sectional view of a portion taken along the line 6—6 as shown in FIG. 5, showing the lock bolt and the locking member located at a locked position.

As shown in FIGS. 5–7, the motorcycle disk brake lock 10 of the present invention is provided with the lock bolt 14 which can be located in various ways and can be therefore used in conjunction with a second locking member 18 replacing the first locking member 16. In such application, the left and the right positions of each retaining pin 25 and the first locating portion 42 must be interchanged.

The second locking member 18 comprises a second lock body 80, a second lock core 82, a locating member 90, and a fourth spring 94. The second lock body 80 is disposed on the left side of the main body 12 such that the second lock body 80 is capable of moving back and forth in the direction of the axis of the main body 12, and that the second lock body 80 is capable of moving in the direction perpendicular to the direction of the longitudinal axis of the first recess 24. The second lock core 82 is disposed in the inner side of the second lock body 80 such that the second lock core 82 is capable of moving back and forth along with the second lock body 80, and that the second lock core 82 can be driven by the second lock body 80 to rotate. The second lock core 82 is provided peripherally with a cut 84 and is further provided at the one end thereof with a second locating portion 68 capable of extending to remain in the first recess 24 through a small through hole 86. The locating member 90 is disposed in the main body 12 such that the locating member 90 is corresponding in location to the cut 84, and that the locating member 90 is urged by a third spring 92. The fourth spring 94 is disposed between the second lock body 80 and the main body 12 such that the fourth spring 94 urges constantly the second lock body 80.

In operation, the lock bolt 14 is first retreated to the inside of the first recess 24 before the second lock body 80 is pressed to actuate the second lock core 82 so that the second locating portion 68 is inserted into the corresponding first locating portion 42 so as to retain the lock bolt 14. The lock bolt 14 can be released by rotating the second lock core 82 to cause the cut 84 to disengage the locating member 90. As a result, the second lock body 80 is urged by the fourth spring 94 to move outwards to bring about the disengagement of the first locating portion 42 with the second locating portion 68.

The retaining portion 40 of the lock bolt 14 can be so constructed that the angle formed axially by the retaining portion 40 and the lower end of the lock bolt 14 is smaller than 90 degrees, thereby enabling the retaining portion 40 to be inserted downwards into the heat-radiating hole 74 of the disk brake. As a result, the retaining portion 40 is held securely in the heat-radiating hole 74 of the disk brake.

What is claimed is:

1. A motorcycle disk brake lock comprising:

a main body having a base portion, a first arm, a second arm, and an insertion slot formed between said first arm and said second arm;

a lock bolt disposed on said first arm such that said lock bolt slides back and forth in a predetermined direction, said lock bolt having a retaining portion extending beyond said first arm to remain outside an open end of said insertion slot, said lock bolt provided peripherally with at least one first locating portion; and a locking member disposed in a predetermined location of said main body and provided with a second locating portion capable of moving back and forth in a predetermined direction perpendicular to a sliding direction of said lock bolt, said second locating portion being engageable with said first locating portion, wherein said axis of said retaining portion and said axis of said lock bolt form an angle smaller than 90 degrees.

2. The motorcycle disk brake lock according to claim 1 wherein said main body has a first recess extending inwards from one end of said first arm for said lock bolt to be placed therein, and a second recess extending from an inner edge of said first recess said second locating portion slidably engaged in said second recess to permit engagement to said first locating portion.

3. The motorcycle disk brake lock according to claim 2 wherein said first arm is provided at one end thereof with a trough having an open end corresponding in location to said insertion slot.

4. The motorcycle disk brake lock according to claim 1 wherein said retaining portion is curved toward said open end of insertion slot from said one end of said lock bolt.

5. The motorcycle disk brake lock according to claim 4 wherein said retaining portion has an axis perpendicular to an axis of said lock bolt.

6. The motorcycle disk brake lock according to claim 2 wherein said main body has a third recess extending inwards from an outer edge of said main body for receiving therein said locking member comprising a lock body and a lock core, said lock body being disposed in said main body such that said lock body can move back and forth, said lock core being locating in said lock body such that said lock core is movable back and forth in said third recess, said lock core having the second locating portion located at one end thereof, said locking member further comprising a spring disposed in said third recess such that said spring urges constantly said lock core.

7. The motorcycle disk brake lock according to claim 6 wherein said lock core is driven by said lock body to rotate such that said second locating portion is not caused to move back and forth, said lock core provided peripherally with a locating hole corresponding in location to said locating member which is urged by a spring to press against said lock core.

8. The motorcycle disk brake lock according to claim 2 wherein said main body has a third recess extending inwards from an outer edge thereof for receiving therein said locking member, said third recess being in communication with said second recess, said locking member comprising a lock body disposed securely in said third recess, a lock core extending from said lock body into said second recess, and a sliding block capable of being driven by a spring to move back and forth in said second recess, said sliding block having the second locating portion corresponding to said first locating portion on a first end of said lock bolt.

9. The motorcycle disk brake lock according to claim 8 wherein a second end of said sliding block is provided with a cut, a spring being disposed between said second end of said sliding block and said main body; and wherein said lock core is disposed pivotally on said lock body and has a flat end engageable with said cut.

10. The motorcycle disk brake lock according to claim 1 wherein said first arm has a portion extending beyond said main body, said portion being greater in length than said second arm.

11. The motorcycle disk brake lock according to claim 1 wherein said first locating portion is located in a periphery of said lock bolt in a form of indentation.

12. The motorcycle disk brake lock according to claim 1 wherein said lock bolt is provided peripherally with a guide slot extending in the moving direction of said lock bolt; and wherein said main body is provided with a retaining pin opposite in location to said guide slot, said retaining pin having one end capable of extending into said guide slot for limiting a moving range of said lock bolt.

* * * * *